Figure 1:
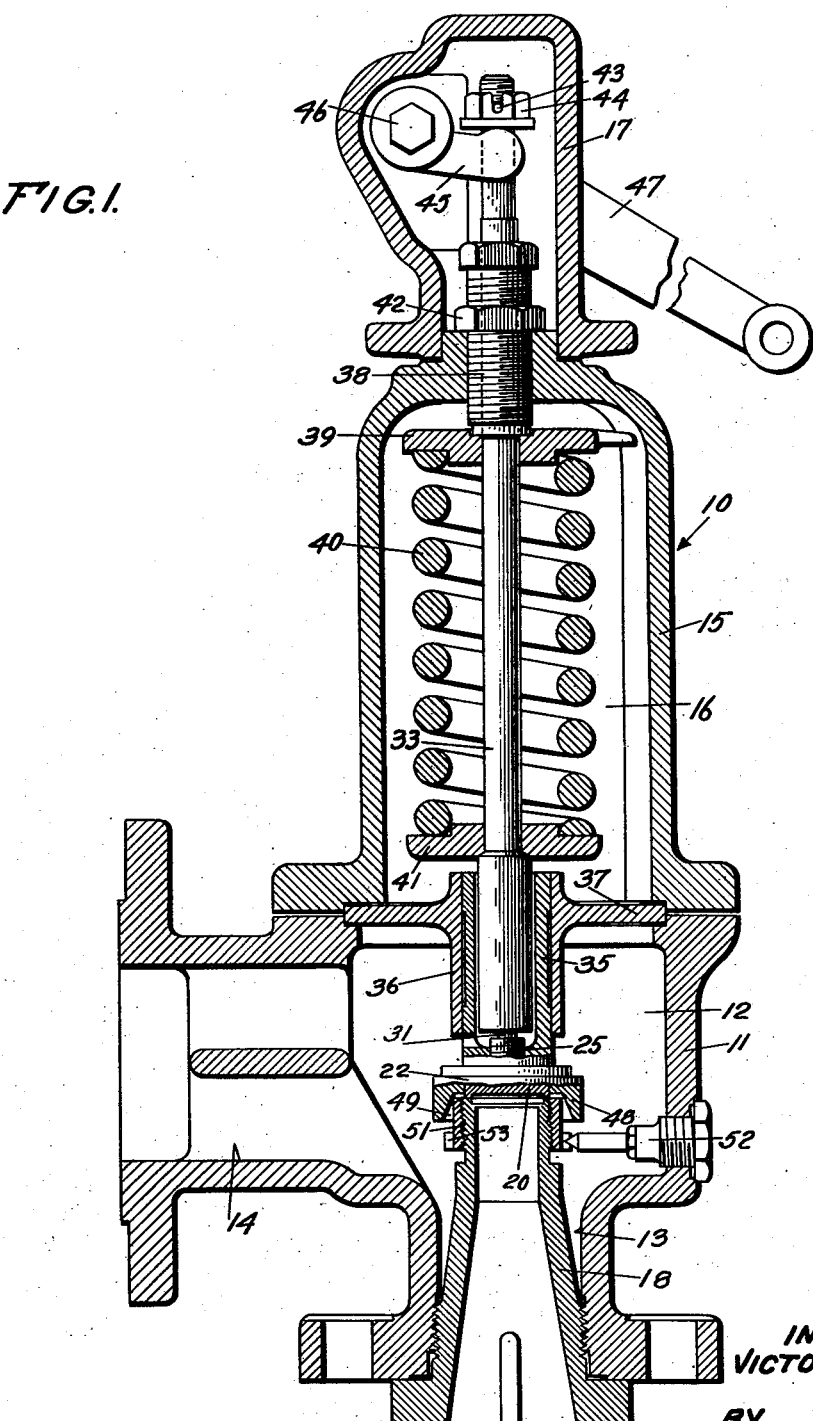

Aug. 8, 1950  V. W. FARRIS  2,517,858
SAFETY VALVE
Filed Nov. 29, 1947  2 Sheets-Sheet 1

INVENTOR
VICTOR W. FARRIS
BY
Bernard H. Remlein
ATTORNEY

Aug. 8, 1950 V. W. FARRIS 2,517,858
SAFETY VALVE
Filed Nov. 29, 1947 2 Sheets-Sheet 2

INVENTOR
VICTOR W. FARRIS
BY Bernard H Lemlein
ATTORNEY

Patented Aug. 8, 1950

2,517,858

UNITED STATES PATENT OFFICE 2,517,858

SAFETY VALVE

Victor W. Farris, Tenafly, N. J.

Application November 29, 1947, Serial No. 788,901

9 Claims. (Cl. 137—53)

This invention relates to high velocity safety valves.

In devices of this general character, maximum efficiency is attained when the lift of the valve disc is equal, during discharge, to at least $$\frac{D}{4}$$

where D is the diameter of the discharge orifice. It has heretofore been difficult to attain such a lift due, among other things, to the use of too small a ratio of disc guide length-to-disc guide diameter. When small ratios are employed in this connection, the disc, upon lifting, has a tendency to cock in its guide and thereby be prevented from rising to its full aperture. Similarly, when the disc returns to its seat, the same cocking prevents the attainment of complete closure, causing the valve to leak.

Other factors which contribute to these disadvantages are distortion of the valve spring and distortion of the valve stem, both of which cause misalignment of the movable parts of the valve which, in turn, prevents proper lift and true seating of the disc.

Now, it is of no use to attain a lift of $$\frac{D}{4}$$

if valve capacity is sacrificed in the process, and this has been true of many valves of the prior art. When the disc of a safety valve commences to rise, a discharge through the primary orifice takes place. However, the discharging fluid is not permitted unrestricted freedom, but is generally made to act against a surface of increased area whereby a greater total force may be developed in opposition to the spring load, thereby overcoming said load and enabling the attainment of maximum capacity in a shorter interval of time than would otherwise be the case. The restriction of the discharging fluid is accomplished by a secondary orifice provided, for example, between the disc-holding member and the blowdown ring of the valve. This orifice, in prior art devices, generally remains of constant size throughout the valve lift and is generally of such dimensions as to prevent attainment of maximum capacity even when the valve is open to its fullest extent.

It is, therefore, one of the objects of the present invention to eliminate the above referred to valve cocking and thereby enable the disc readily to open to its maximum aperture and readily to seat true and avoid leakage.

It is another object of the present invention to eliminate the effects of the above referred to spring and stem distortions and thereby aid in the attainment of the disc opening and closing as expressed in the previous paragraph.

It is still another object of the present invention to provide a safety valve in which a lift of $$\frac{D}{4}$$

is attained and at the same time provide maximum capacity.

It is a further object of the present invention to provide a safety valve wherein the disc diameter closely approximates the orifice diameter in order to prevent back-pressure surges from causing objectionable unbalanced conditions.

It is a still further object of the present invention generally to improve the art of safety valves.

These, and other objects which will become apparent as the detailed description progresses, are accomplished, broadly, in the following manner:

It has been found that if the bearing surfaces of the disc-guiding members have length-to-diameter proportions of at least 2 to 1, the cocking and resulting binding which have heretofore prevented a lift of $$\frac{D}{4}$$

are eliminated, and the valve not only opens to its maximum extent, but seals completely when the valve returns to its seat. In the present invention, therefore, the bearing surfaces are dimensioned to provide these proportions.

Further, a type of coupling is employed between the valve stem and disc of the present invention which is such that distortion and resulting misalignment of the stem or the spring or the disc holder can have no effect upon the disc, the latter being permitted to locate itself and come home true each time the valve operates.

Still further, the construction of the disc holder in the present invention is such that as the valve lifts, the secondary orifice is continually increased in size in proportion to the extent of the lift, thereby providing gradually increasing capacity until the valve is completely open, at which time maximum capacity is attained.

In the accompanying specification there shall be described, and in the annexed drawings shown, an illustrative embodiment of the safety valves of the present invention. It is, however, to be clearly understood that the present invention is not to be limited to the exact details herein shown for purposes of illustration only, inasmuch as changes therein may be made without the exercise of invention and within the true spirit and scope of the claims hereto appended.

Figure 2:
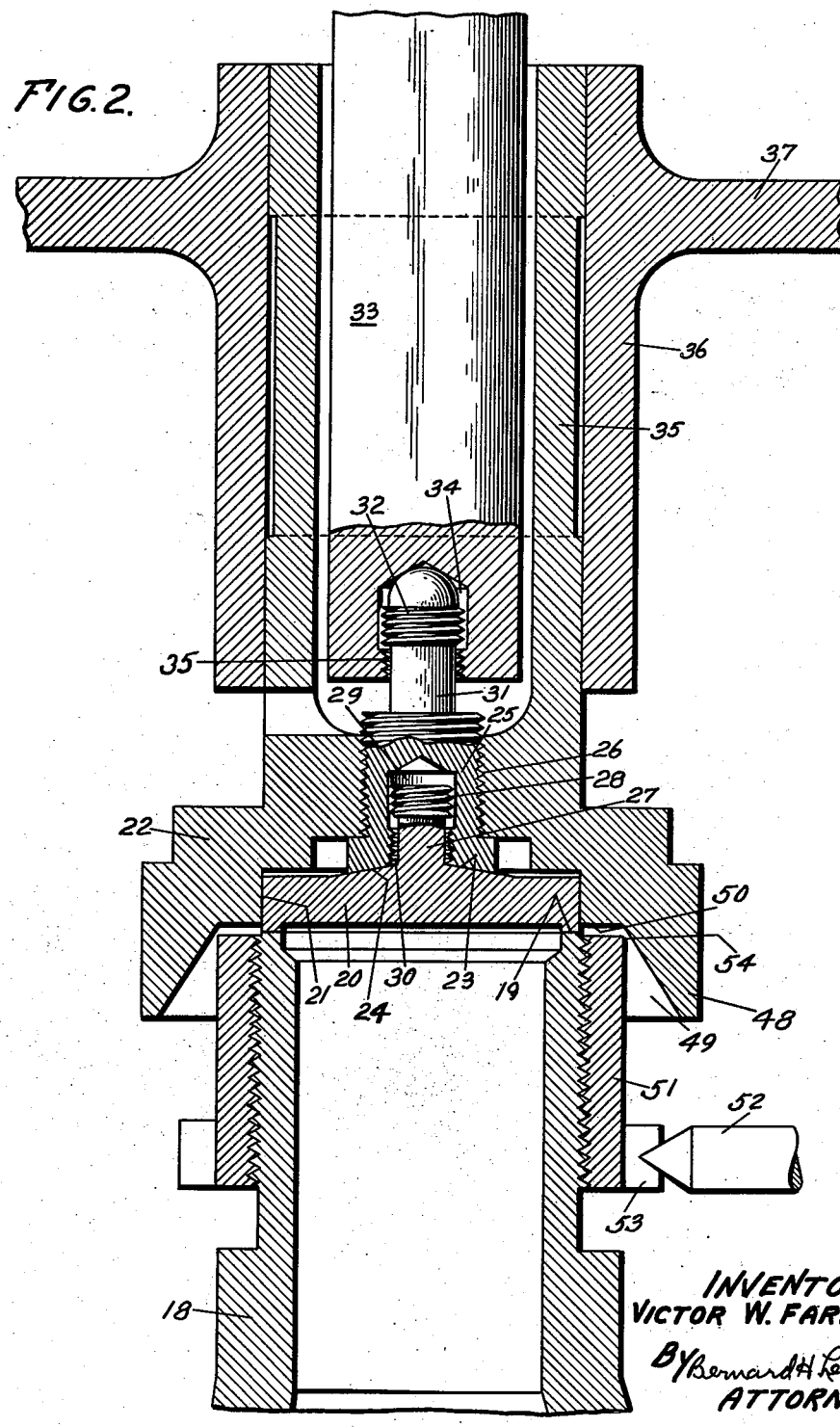

In said drawings, Fig. 1 is a vertical sectional view taken substantially through the center of a safety valve made in accordance with the present invention; and Fig. 2 is an enlarged, similar view of the disc and disc-guided mechanism of the same.

Referring now more in detail to the aforesaid illustrative embodiment of the present invention, with particular reference to the drawings illustrating the same, the numeral 10 generally designates a safety valve including a valve body 11 having a central chamber 12 and inlet and outlet ports 13 and 14 communicating with said central chamber, a bonnet 15 mounted on said body 11 and providing a spring chamber 16, and a cap 17 secured at the upper end of said bonnet 15.

Threadedly engaged in the inlet port 13, and extending into the central chamber 12 of the body 11, is a high velocity nozzle 18 at the inner end of which there is formed a seat 19.

Cooperable with the seat 19 is a valve disc 20, said disc being disposed in a recess 21 formed in the underside of a disc-holding member 22. The upper surface of the disc 20 is provided with a spherical portion 23 adapted slidingly to engage in a concavity 24 formed in the undersurface of a coupling member 25 threadedly engaged in the disc-holding member 22, as at 26.

Rising from the center of the spherical portion 23 of the disc 20 is a rod-like extension 27 having at the outer end thereof an enlarged threaded head or ball 28, and formed in the coupling member 25 is a socket or recess 29 which is larger than said head 28 and which is adapted to receive the same through a reduced threaded bore 30. Thus, a ball-and-socket connection or universal joint is provided between the disc 20 and the disc-holding member 22, thereby permitting such relative movement between these elements that should the disc-holding member become misaligned in the valve, the disc has sufficient freedom of movement to locate itself and come home true on the seat 19.

Extending from the end of the coupling member 25 opposite to that provided with the threaded bore 30 is a rod-like portion 31 having at its outer end a threaded head or ball 32, and formed in the lower end of a valve stem 33 is a socket or recess 34 which is larger than said head and which is adapted to receive the same through a reduced threaded bore 35. Thus, a ball-and-socket connection or universal joint is also provided between the stem 33 and the disc-holding member 22, thereby permitting such relative freedom of movement between these elements that should the stem become distorted or misaligned, the resulting effects are not transmitted to the disc-holding member or the disc carried thereby.

The stem 33 rises upwardly through a sleeve 35 formed with the disc-holding member 22, said sleeve being slidably mounted in a cylinder 36 supported in spaced axial relationship with the nozzle 18 from a baffle 37 secured at the periphery thereof between the valve body 11 and the bonnet 15, said baffle substantially isolating the spring chamber 16 of said bonnet from the central chamber 12 of said valve body. The cylinder 36 has length-to-diameter proportions of at least 2 to 1 and the sleeve 35 has dimensions which are comparable to those of said cylinder, whereby the disc-holding member 22 is prevented from cocking during the opening and closing of the valve to substantially eliminate any tendency to bind and interfere with maximum opening and tight closing.

Near its upper end, the stem 33 is slidably mounted in a spring-adjusting screw 38 engaged in the bonnet 15, said screw bearing against a button 39 which is loosely mounted on the stem 33 and which, in turn, bears against the upper end of a coil spring 40 the lower end of which abuts another button 41 which is fastened on the stem 33. The screw 38 is adapted to be locked in position by a nut 42.

Threadedly engaged on the outer end of the stem 33, and locked in position thereon by a cotter pin 43, is a stem test nut 44, the underside of said nut being engaged by a cam 45 fixed upon a stud shaft 46 journalled in the cap 17, said shaft also having fixed thereon a test lever 47.

Surrounding the disc 20 and formed on the disc-holding member 22, is a depending flange 48, said flange having an interior surface 49 which flares outwardly from a flat, secondary disc area 50 presented by the undersurface of the disc-holding member 22, in a direction opposite to the flow of the fluid through the nozzle 18.

Threadedly engaged adjacent the seat end of the nozzle 18 is a blowdown ring 51 adapted, after suitable adjustment, to be fixed in position by a locking screw 52 carried in the valve body 11 and engageable with serrations 53 formed about said ring.

When the pressure of the fluid acting against the disc 20 is sufficient to cause said disc to rise, discharge commences. As the fluid passes through the primary orifice bounded by the outer edge of the disc 20 and the seat 19, said fluid acts against a surface augmented by the area of the flat 50. Although the fluid has passed by the primary orifice, it does not have unrestricted freedom. It is restricted by the secondary orifice bounded by the upper, outer edge 54 of the blowdown ring and the flared surface 49 of the flange 48 of the disc-holding member 22. The initial force developed against the spring load of the valve is thus increased and the disc 20, together with the disc-holding member 22 commences to rise more rapidly. As the disc and the holding member thereof continue to rise, the area against which the discharging fluid acts increases in proportion to the lift, whereby maximum lift is quickly attained. It will be noted that not only is the disc area increased as the disc rises, but the secondary orifice likewise increases in size so as to enable the valve to pass increasingly greater capacity, the slope of the flared surface 49 being such that when maximum lift is achieved, so, too, is maximum capacity.

Thus, there is provided a safety valve in which maximum lift and maximum capacity are quickly attained once the fluid pressure reaches the point at which it is desired that discharge take place, and the construction of the valve is such that cocking and binding which ordinarily interfere with the attainment of maximum lift, maximum capacity, and tight closing are eliminated, as are the transmission to the disc of the objectionable effects of spring and stem distortion and misalignment which have heretofore interfered with the proper functioning of similar devices.

Other objects and advantages of the safety valves of the present invention will readily occur to those skilled in the art to which the same relates.

What is claimed is:

1. A safety valve comprising: a valve body; a nozzle extending into said body and provided with a seat at the inner end thereof; a bearing supported in said body in spaced axial relationship with said nozzle; a disc-holding member slidably mounted in said bearing; a disc cooperable with said seat; a spring-pressed stem slidably mounted in said valve body; and a coupling member carried by said holding member and having universal joint connections with said disc and said stem.

2. A safety valve comprising: a valve body; a nozzle extending into said body and provided with a seat at the inner end thereof; a bearing supported in said body in spaced axial relationship with said nozzle; a disc-holding member slidably mounted in said bearing; a disc cooperable with said seat; a spring-pressed stem slidably mounted in said valve body; and a coupling member carried by said holding member and having ball-and-socket connections with said disc and said stem.

3. A safety valve comprising: a valve body; a nozzle extending into said body and provided with a seat at the inner end thereof; a cylinder supported in said body in spaced axial relationship with said nozzle; said cylinder having a bearing surface the length-to-diameter proportions of which are at least 2 to 1; a disc-holding member including a sleeve portion slidably mounted in said cylinder; said sleeve portion having a bearing surface the length and diameter dimensions of which are comparable to those of the bearing surface of said cylinder; a disc cooperable with said seat; a spring-pressed stem slidably mounted in said valve body; and a coupling member carried by said holding member and having universal joint connections with said disc and said stem.

4. A safety valve comprising: a valve body; a nozzle extending into said body and provided with a seat at the inner end thereof; a bearing supported in said body in spaced axial relationship with said nozzle; a disc-holding member slidably mounted in said bearing; a disc coupled by a ball-and-socket connection to said holding member and cooperable with said seat; and a spring-pressed stem slidably mounted in said valve body and coupled by a ball-and-socket connection to said holding member.

5. A safety valve comprising: a valve body; a nozzle extending into said body and provided with a seat at the inner end thereof; a cylinder supported in said body in spaced axial relationship with said nozzle; said cylinder having a bearing surface the length-to-diameter proportions of which are at least 2 to 1; a disc-holding member including a sleeve portion slidably mounted in said cylinder; said sleeve portion having a bearing surface the length and diameter dimensions of which are comparable to those of the bearing surface of said cylinder; a disc coupled by a ball-and-socket connection to said holding member and cooperable with said seat; and a spring-pressed stem slidably mounted in said valve body and coupled by a ball-and-socket connection to said holding member.

6. A safety valve comprising: a valve body; a nozzle extending into said body and provided with a seat at the inner end thereof; a bearing supported in said body in spaced axial relationship with said nozzle; a disc-holding member slidably mounted in said bearing; a disc coupled to said holding member and cooperable with said seat to provide a primary orifice for discharging fluid; said holding member including a portion surrounding said disc and presenting a surface generally flared in a direction opposite to the flow of fluid through said nozzle to provide a secondary orifice of gradually increasing cross-section for said fluid; and a spring-pressed stem slidably mounted in said valve body and coupled to said holding member.

7. A safety valve comprising: a valve body; a nozzle extending into said body and provided with a seat at the inner end thereof; a bearing supported in said body in spaced axial relationship with said nozzle; a disc-holding member slidably mounted in said bearing; a disc cooperable with said seat; said holding member including a portion surrounding said disc and presenting a surface generally flared in a direction opposite to the flow of fluid through said nozzle; a spring-pressed stem slidably mounted in said valve body; and a coupling member carried by said holding member and having universal joint connections with said disc and said stem.

8. A safety valve comprising: a valve body; a nozzle extending into said body and provided with a seat at the inner end thereof; a cylinder supported in said body in spaced axial relationship with said nozzle; said cylinder having a bearing surface the length-to-diameter proportions of which are at least 2 to 1; a disc-holding member including a sleeve portion slidably mounted in said cylinder; said sleeve portion having a bearing surface the length and diameter dimensions of which are comparable to those of the bearing surface of said cylinder; a disc coupled by a ball-and-socket connection to said holding member and cooperable with said seat; said holding member including a portion surrounding said disc and presenting a surface generally flared in a direction opposite to the flow of fluid through said nozzle; and a spring-pressed stem slidably mounted in said valve body and coupled by a ball-and-socket connection to said holding member.

9. A safety valve comprising: a valve body; a nozzle extending into said body and provided with a seat at the inner end thereof; a bearing supported in said body in spaced axial relationship with said nozzle; a disc-holding member slidably mounted in said bearing; a disc cooperable with said seat; a spring-pressed stem slidably mounted in said valve body; and a coupling member carried by said holding member and having a socket at one end receptive of a ball extending from said disc and a ball at the other end engageable in a socket formed in said stem.

VICTOR W. FARRIS.

REFERENCES CITED

The following references are of record in the file of this patent:

UNITED STATES PATENTS

| Number | Name | Date |
|---|---|---|
| 2,183,650 | Klafstad | Dec. 19, 1939 |
| 2,278,437 | Gentzel | Apr. 7, 1942 |
| 2,355,916 | Klafstad | Aug. 15, 1944 |
| 2,364,812 | Pierson | Dec. 12, 1944 |